United States Patent
Eldery et al.

(10) Patent No.: US 7,800,925 B2
(45) Date of Patent: Sep. 21, 2010

(54) MITIGATION OF UNBALANCED INPUT DC FOR INVERTER APPLICATIONS

(75) Inventors: Mohamed A. Eldery, Mississauga (CA); Zheng Wang, Mississauga (CA); You Zhou, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 318 days.

(21) Appl. No.: 12/043,062

(22) Filed: Mar. 5, 2008

(65) Prior Publication Data
US 2009/0225571 A1    Sep. 10, 2009

(51) Int. Cl.
H02M 1/12    (2006.01)
H02M 1/14    (2006.01)

(52) U.S. Cl. .................. 363/40; 363/56.01; 363/56.09; 363/97

(58) Field of Classification Search .................. 363/40, 363/56.01, 56.09, 95, 97
See application file for complete search history.

(56) References Cited

U.S. PATENT DOCUMENTS

| | | | |
|---|---|---|---|
| 4,739,464 A | 4/1988 | Nishihiro et al. | |
| 4,788,485 A | 11/1988 | Kawagishi et al. | |
| 4,803,611 A * | 2/1989 | Sashida et al. | 363/98 |
| 5,012,400 A | 4/1991 | Yasuda | |
| 5,105,352 A * | 4/1992 | Iwasa et al. | 363/98 |
| 5,600,548 A | 2/1997 | Nguyen et al. | |
| 5,867,376 A * | 2/1999 | Nakamura et al. | 363/56.01 |
| 5,870,297 A * | 2/1999 | Dahler et al. | 363/95 |
| 7,209,108 B2 * | 4/2007 | Landolt et al. | 345/98 |
| 7,251,113 B1 * | 7/2007 | Batarseh et al. | 361/111 |
| 2003/0103024 A1 * | 6/2003 | Landolt et al. | 345/87 |
| 2007/0120520 A1 | 5/2007 | Miyazaki et al. | |
| 2007/0200601 A1 * | 8/2007 | Landolt et al. | 327/106 |

* cited by examiner

Primary Examiner—Bao Q Vu
(74) Attorney, Agent, or Firm—Oral Caglar, Esq.

(57) ABSTRACT

Mitigating the DC content of an AC output from an inverter is important for electrical system reliability. The inverter may be powered by unbalanced DC inputs while still mitigating the DC content of the AC output wavefrom. The present invention provides methods to mitigate the DC content in the output DC voltage by reshaping the PWM reference signals (carrier signals) according to the DC content in such a way that the DC content is canceled. These reshaped PWM reference signals may be, for example, unsymmetrical reference waveforms. Unlike conventional methods for providing an AC voltage from a DC voltage with an inverter, which may result in DC content in the output AC voltage when an unbalanced DC input voltage is supplied, the present invention provides methods for mitigating the DC content in an AC voltage, even if the inverter providing the AC voltage is supplied with unbalanced DC voltage.

14 Claims, 8 Drawing Sheets

MITIGATION OF UNBALANCED INPUT DC FOR INVERTER APPLICATIONS

BACKGROUND OF THE INVENTION

The present invention generally relates to methods for mitigating the direct current (DC) content of an alternating current (AC) voltage and, more specifically, methods for mitigating the DC content of an AC voltage output from a DC-AC inverter.

The AC inverters used widely in industrial application and aerospace applications are used to convert the DC Voltage from a DC bus to an AC voltage used in motor drives. In addition, the inverters might be used for main engine start and auxiliary power unit (APU) start for an aircraft. Due to the unsymmetrical input DC voltages, the output will have a DC component superimposed on the AC voltage. This DC component may heat motors, saturate inductors, saturate transformers and may result in system tripping. Frequent system tripping may reduce the system reliability. Additionally, the unbalanced DC voltage might result in an unsymmetrical AC voltage waveform which is an unacceptable power quality problem.

AC inverters are used widely to convert the DC voltage to AC voltage which might be regulated voltage at fixed frequency (FF) to supply AC loads or variable frequency to drive AC motors. The source of the DC input used in the aircraft is usually two DC voltage sources (such as +/−270 VDC) with the mid point (neutral point) connected to the ground. This DC input voltage is assumed to be balanced (symmetrical input DC voltages), but it might not be balanced voltage. Traditional inverters use pulse width modulation (PWM) as a switching scheme to control the power electronic devices, such as power transistors or insulated-gate bipolar transistors (IGBTs). With the traditional switching PWM, the unbalanced DC input will be reflected in the AC output as a DC content which is not required. In addition, the unbalanced DC input voltage will distort the AC output voltage and increase the total harmonic distortion (THD) of the AC waveform.

As can be seen, there is a need to provide methods for mitigating DC components from an AC voltage generated from an inverter that may be supplied with an unbalanced DC input.

SUMMARY OF THE INVENTION

In one aspect of the present invention, a method for providing an AC voltage with reduced DC content from an AC inverter comprises providing an unsymmetrical carrier waveform to the AC inverter; and generating an AC voltage from the AC inverter using the unsymmetrical carrier waveform as a power electronics switching signal.

In another aspect of the present invention, a method for providing an AC voltage with reduced DC content from an AC inverter comprises inputting unsymmetrical DC input voltages to the AC inverter; providing an unsymmetrical carrier waveform to the AC inverter; and generating an AC voltage from the AC inverter using the unsymmetrical carrier waveform as a power electronics switching signal, wherein the unsymmetrical carrier waveform is offset from a symmetrical carrier waveform by a factor k, wherein the factor k is determined by the percentage difference between the unsymmetrical DC input voltages.

In a further aspect of the present invention, a DC-AC inverter for producing an AC voltage from an unsymmetrical DC voltage input comprises at least a first and a second power electronic device for each phase of the AC voltage; and a carrier waveform for switching the power electronics, wherein the carrier waveform is an unsymmetrical carrier waveform offset from a symmetrical carrier waveform by a factor k, wherein the unsymmetrical waveform provides the AC voltage with reduced DC content as would be produced in the AC voltage when a DC voltage input is a symmetrical DC voltage input.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides methods for mitigating the DC content of an AC output from an inverter. The inverter may be powered by unbalanced DC inputs while still mitigating the DC content of the AC output waveform. Embodiments of the present invention may be used in any DC-AC inverter that inverts a DC voltage to an AC voltage. The inverters of the present invention could be used in motor drives, engine start, APU start and the like. The source of the DC voltage could be Transformer Rectifier Unit (TRU) AutoTransformer Rectifier Unit (ARTU), DC/DC converters, fuel cell, batteries, rectifiers or any other DC voltage source. Embodiments of the present invention provides methods to mitigate the DC content in the output DC voltage by reshaping the PWM reference signals (carrier signals) according to the DC content in such a way that the DC content is canceled. These reshaped PWM reference signals may be, for example, unsymmetrical reference waveforms.

Unlike conventional methods for providing an AC voltage from a DC voltage with an inverter, which may result in DC content in the output AC voltage when an unbalanced DC input voltage is supplied, the present invention provides methods for mitigating the DC content in an AC voltage, even if the inverter providing the AC voltage is supplied with unbalanced DC voltage. Some conventional methods of providing an AC voltage from a DC voltage with an inverter may use a shifting signal to filter the output AC voltage. These conventional methods, however, will not remove DC content in the AC voltage when an unbalanced DC input voltage is provided to the inverter.

Figure 1:
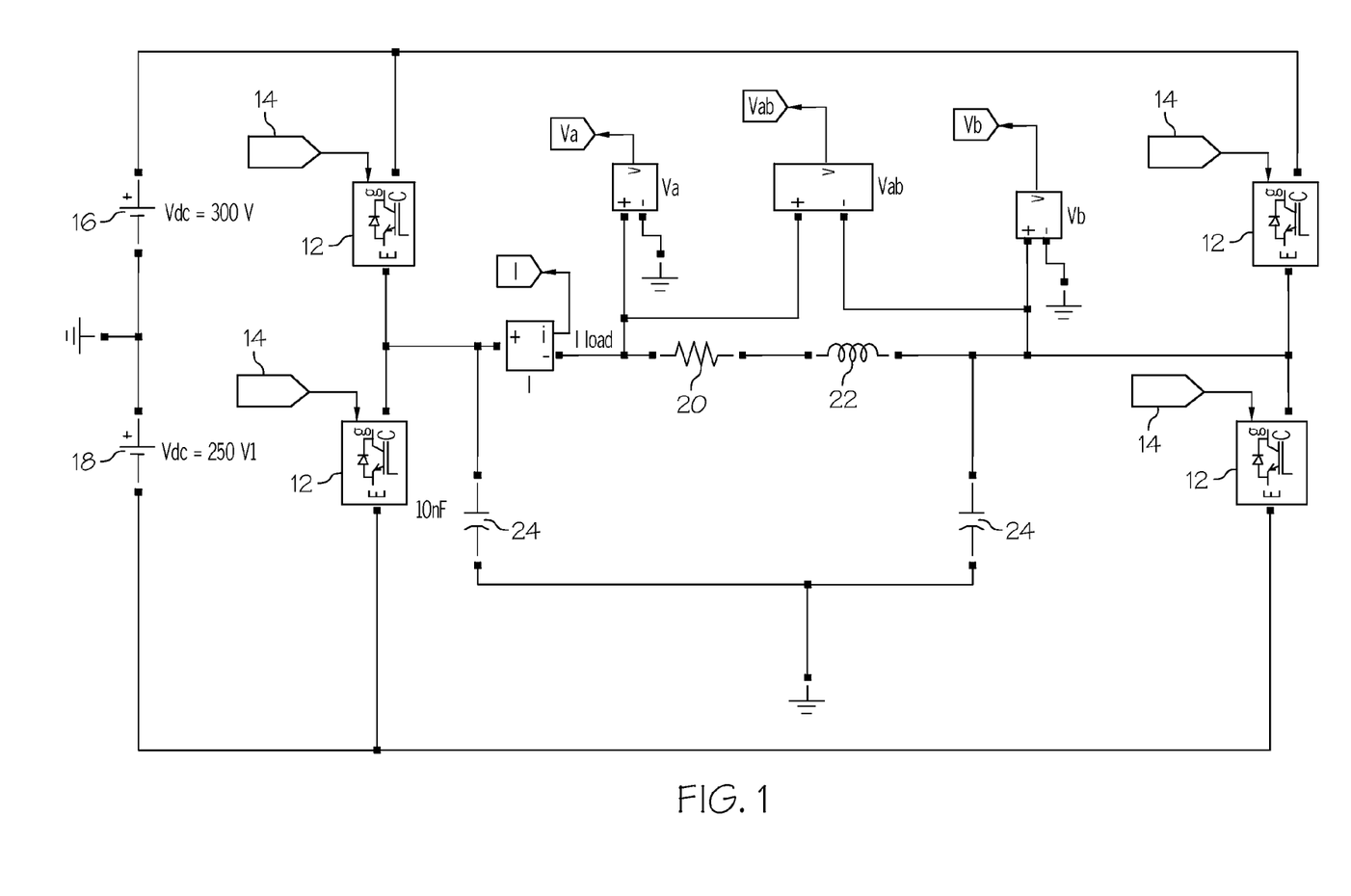
FIG. 1 is a schematic drawing showing a two-phase inverter H-bridge which may be used as an inverter with the methods of the present invention.

Referring to FIG. 1, there is shown a schematic drawing of the circuit topology of a typical two-phase H-bridge inverter 10 into which the methods of the present invention, as described below, may be applied. The inverter 10 may include a plurality of IGBTs 12, each driven by a gating signal 14. In the case of a two-phase inverter 10, two IGBTs 12 may be present for each of the two DC inputs 16, 18. In the case of a three-phase inverter (not shown), there may be three IGBTs for each of the two DC inputs.

The inverter 10 may output two AC voltage signals Va, Vb, a current signal I, and a line-to-line voltage signal Vab. Filtering components, including a capacitors 24 and a load (could be resistor 20, inductor 22) may be present in the inverter 10.

Figure 2:
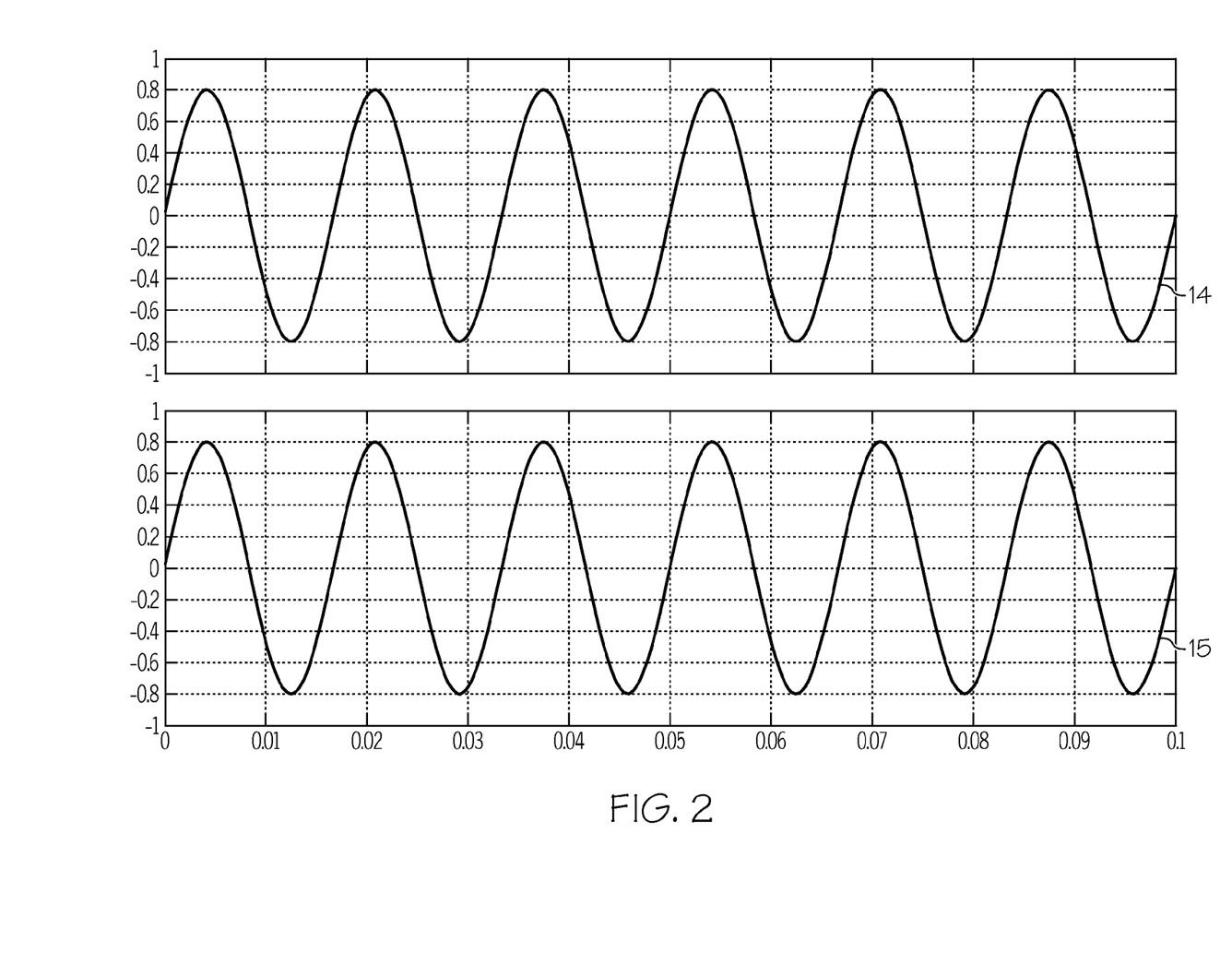
FIG. 2 is a graph showing a carrier signal from the inverter of FIG. 1 without the use of the methods of the present invention.

According to the required voltage and frequency, pattern signals 14 (also called gating signals 14 or carrier signals 14) may be generated to be used by the inverter 10 to vary the switching width of the IGBT's 12. The carrier signals 14 may be a sinusoidal wave. Two parameters that are critical for the carrier signals 14 are the frequency and the amplitude. FIG. 2 shows a typical carrier signal 14 which is used as a carrier waveform for one leg of the bridge, and signal 15 which is used as a carrier waveform (could be inverted based on the switching analogy) for the other leg.

Figure 3:
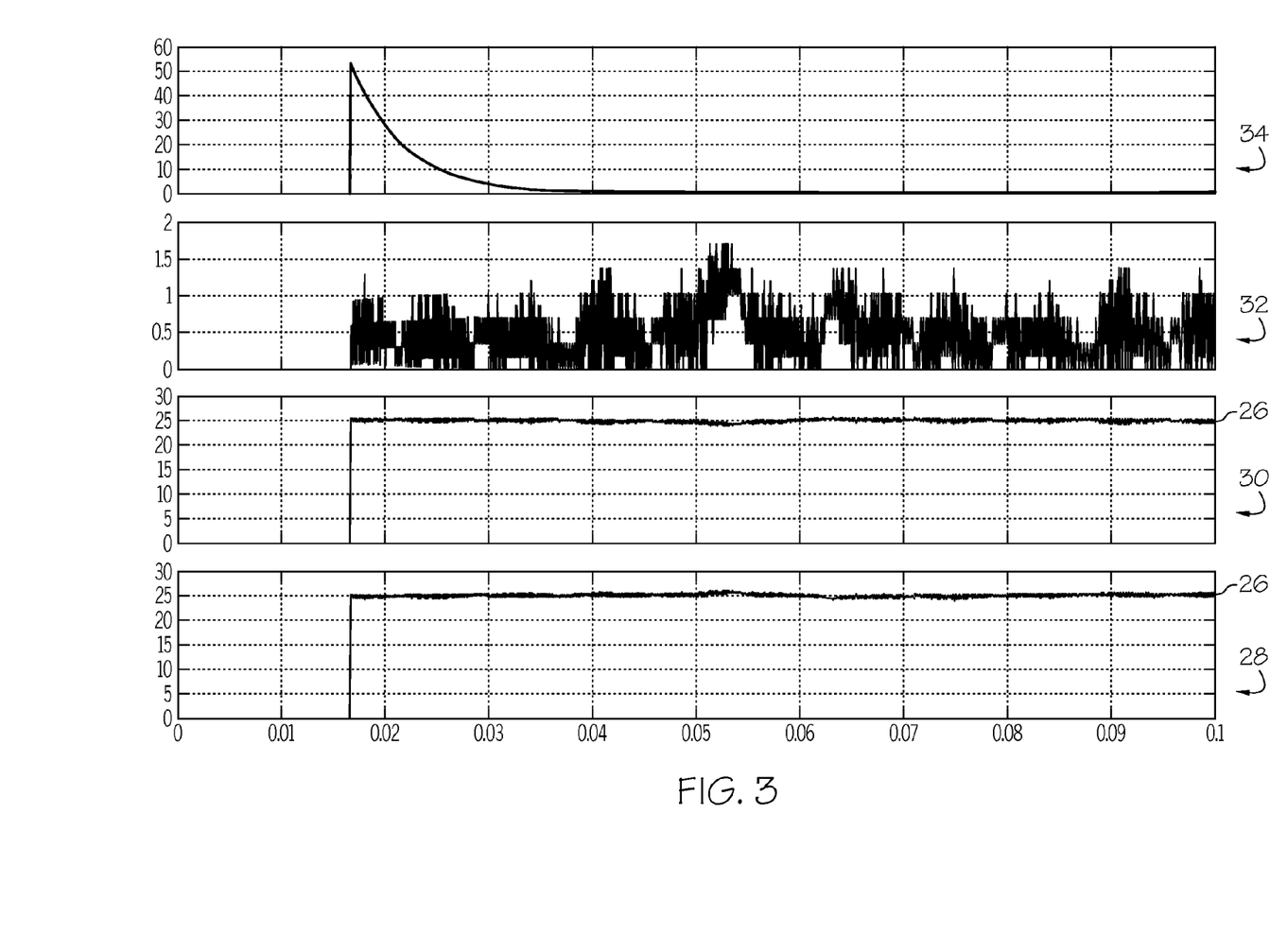
FIG. 3 is a view showing multiple graphs of the DC content in the AC side of the inverter of FIG. 1 when the carrier signal of FIG. 2 is applied thereto.

With conventional PWM and unbalanced DC input voltage 16, 18, the AC output voltage (Va, Vb) may have a DC component 26 as shown in FIG. 3. The bottom trace 28 shows the DC component 26 of the AC voltage Vb (right leg voltage) to ground. The trace 30 above the bottom trace 28 shows the DC component 26 of the AC voltage Va (left leg voltage) to ground. The second trace 32 shows the DC component of the line-to-line voltage Vab. The top trace 34 shows the DC content in the output current through the load 20 and 22.

As can be seen from FIG. 3, the phase-ground voltages Va, Vb have a DC component 26, however the line-to-line (also referred to as phase-phase) voltage Vab does not have this component. Although it may be possible to cancel the DC content 26 from the phase-ground voltage Va, Vb by shifting the carrier 14 frequency, the DC content 26 will then appear in the line-to-line voltage Vab.

Figure 4:
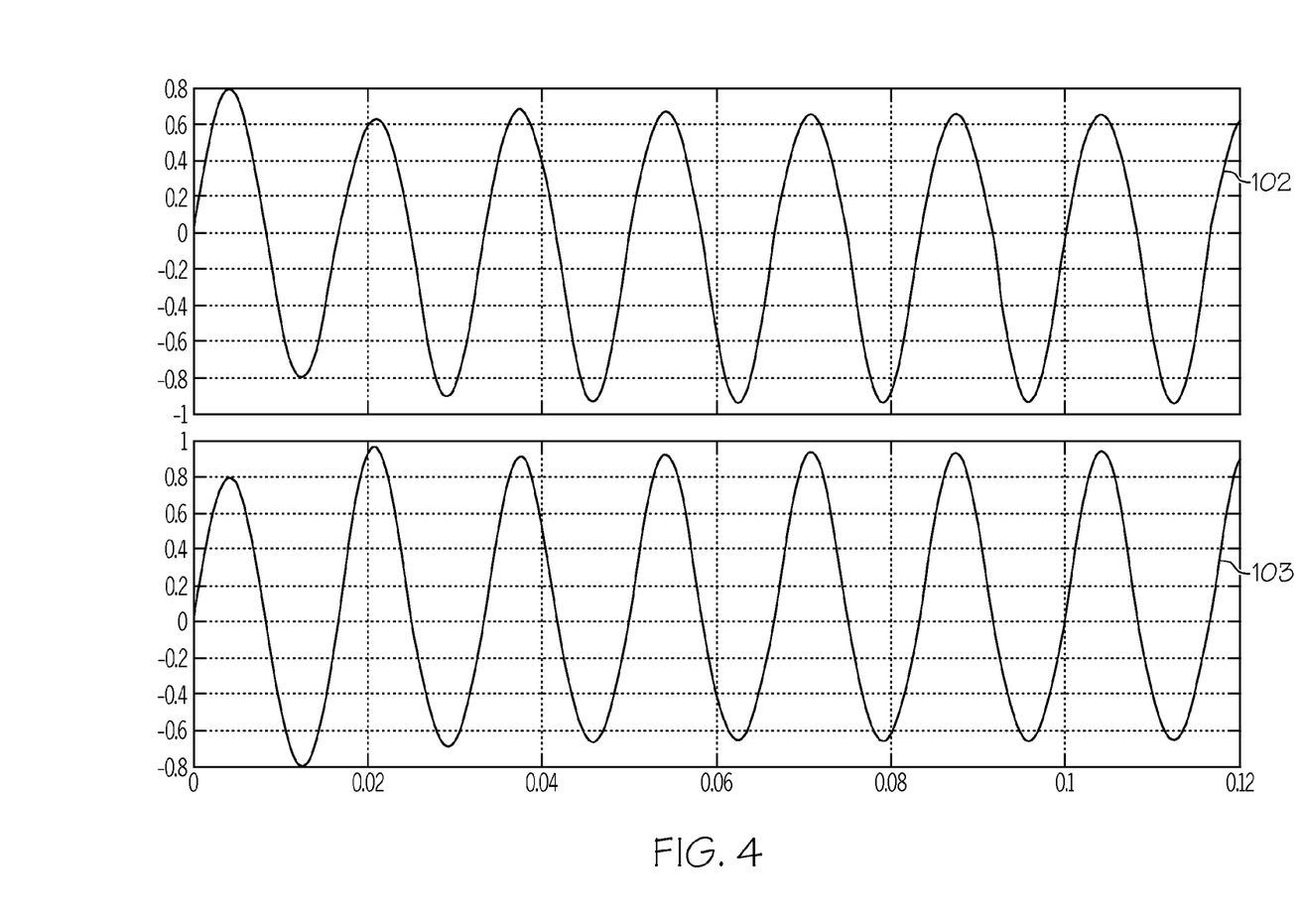
FIG. 4 is a graph of carrier signals obtained by methods of the present invention.

Referring now to FIG. 4, methods of the present invention may cancel the DC component 100 (see FIG. 6) of the AC output voltage by introducing a new pattern of a carrier signal 102 (also referred to as a power electronics switching signal). The traditional carrier signal 14 (see FIG. 2) may be a symmetrical sinusoidal waveform because it assumes a balanced (or symmetrical) DC input. If the input voltage is not balanced (asymmetrical), the carrier signal 102 should be unsymmetrical as well, in such a way that each unbalance may cancel the other. In other words, if the DC is unsymmetrical with 10% of the rated values, the carrier signal 102 should be unsymmetrical with the same amount, but in the reverse direction. FIG. 4 shows the carrier signal 102 which is used as a carrier waveform for one leg of the bridge, and signal 103 which is used as a carrier waveform (could be inverted based on the switching analogy) for the other leg.

A symmetrical carrier signal (also referred to as symmetrical carrier signal u(t)) may be defined by a control algorithm which defines its amplitude and the frequency. The present invention may provide methods for a redefined carrier signal 102 (also referred to as carrier signal $u_n(t)$), which may be obtained by multiplying the symmetrical carrier signal u(t) by a factor, y according to the following:

If u(t)<0, then y=1+k and if u(t)>0, then y=1−k, and $u_n(t)$ =y*u(t), wherein k is a factor that may be determined according to the percentage of the unbalanced DC input voltage level, or a factor that may be determined according to the percentage of the DC content in the output voltage, both of which determinations are described below.

Figure 5:
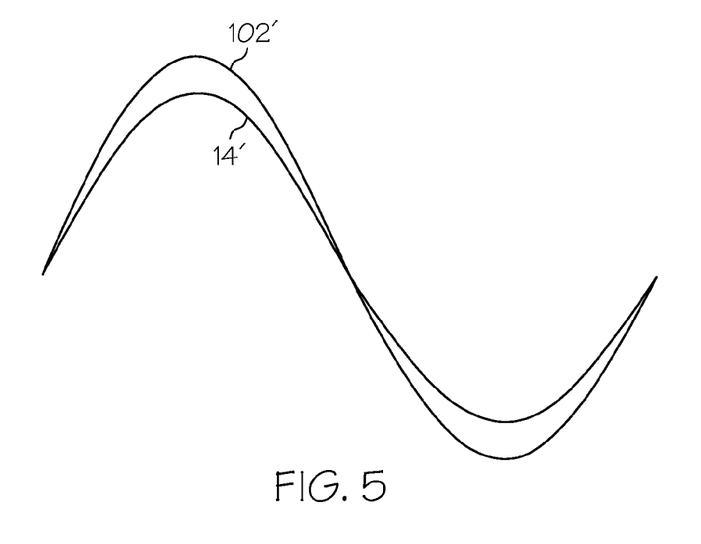
FIG. 5 shows a graph of carrier signals obtained by methods of the present invention superimposed on traditional carrier signals.

As can be seen from FIG. 4, when applying the formulas above to the symmetrical carrier signal u(t), the sinusoidal waveform that is the new carrier signal 102, may be shifted to an unsymmetrical sinusoidal waveform. To further clarify the difference between a traditional carrier signal 14' and a carrier signal 102' of the present invention, FIG. 5 shows a comparison between the two carrier waveforms 14', 102' at k-factor of 20%. It is clear that, the carrier signal 102' is multiplied by the (1+k) at the positive half cycle and is multiplied by (1−k) at the negative half cycle.

The value of the factor k may depend upon the amount of the unbalance between the two DC input sources. Two methods may be used to calculate this factor.

Method 1

Figure 6:
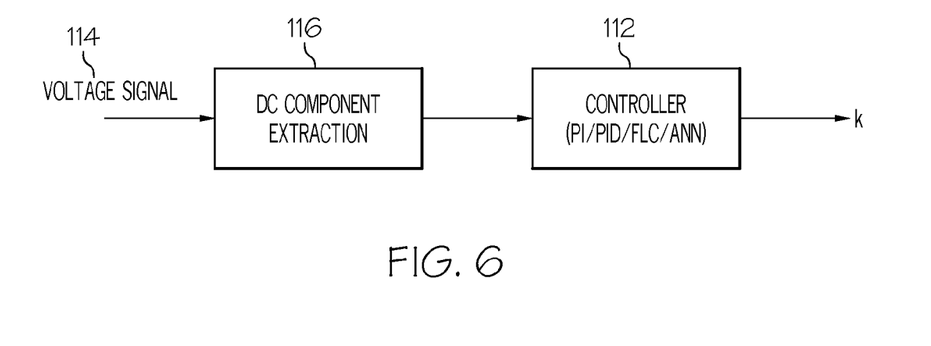
FIG. 6 is a block diagram showing one method for calculating a factor k according to methods of the present invention.

Referring to FIG. 6, this method may rely on measuring the AC output voltage 114 of the inverter and calculating the value of the DC content 116 of each phase individually. This means that, in the three phase system, there may be three measurement blocks. In the two-phase system, there may be two measurement blocks. The AC output voltage 114 may be measured referenced to the same ground point as the DC midpoint.

The measured DC content 116 may be compared to zero value and processed by a controller 112 (see FIG. 6) to define the factor k. The controller 112 may, for example, change the factor k in a first direction and measure the DC content of the AC signal. If the DC content increases, the controller 112 may change the factor k in a second direction until the factor k is determined to produce a minimum amount of DC content in the AC signal. Alternatively, the controller may look-up the measured DC content from each leg of the AC current to determine a pre-programmed value for the factor k. The controller 112 may be a controller known to one of skill in the art, such as a proportional/integral (PI), proportional/integral/differential (PID), fuzzy logic (FL), artificial neural network (ANN), lead-lag compensator, or any other controller. The factor k may be passed to the equations described above to calculate $u_n(t)$.

Method 2

This method may rely on measuring the two DC input voltages individually referenced to the mid point. The method may then calculate the difference between the two DC input voltages and add this difference in an equation that calculated the factor k. The mentioned equation (If u(t)<0, then y=1+k and if u(t)>0, then y=1−k, and $u_n(t)$=y*u(t)) may depend on the system parameters and configuration.

Figure 7:
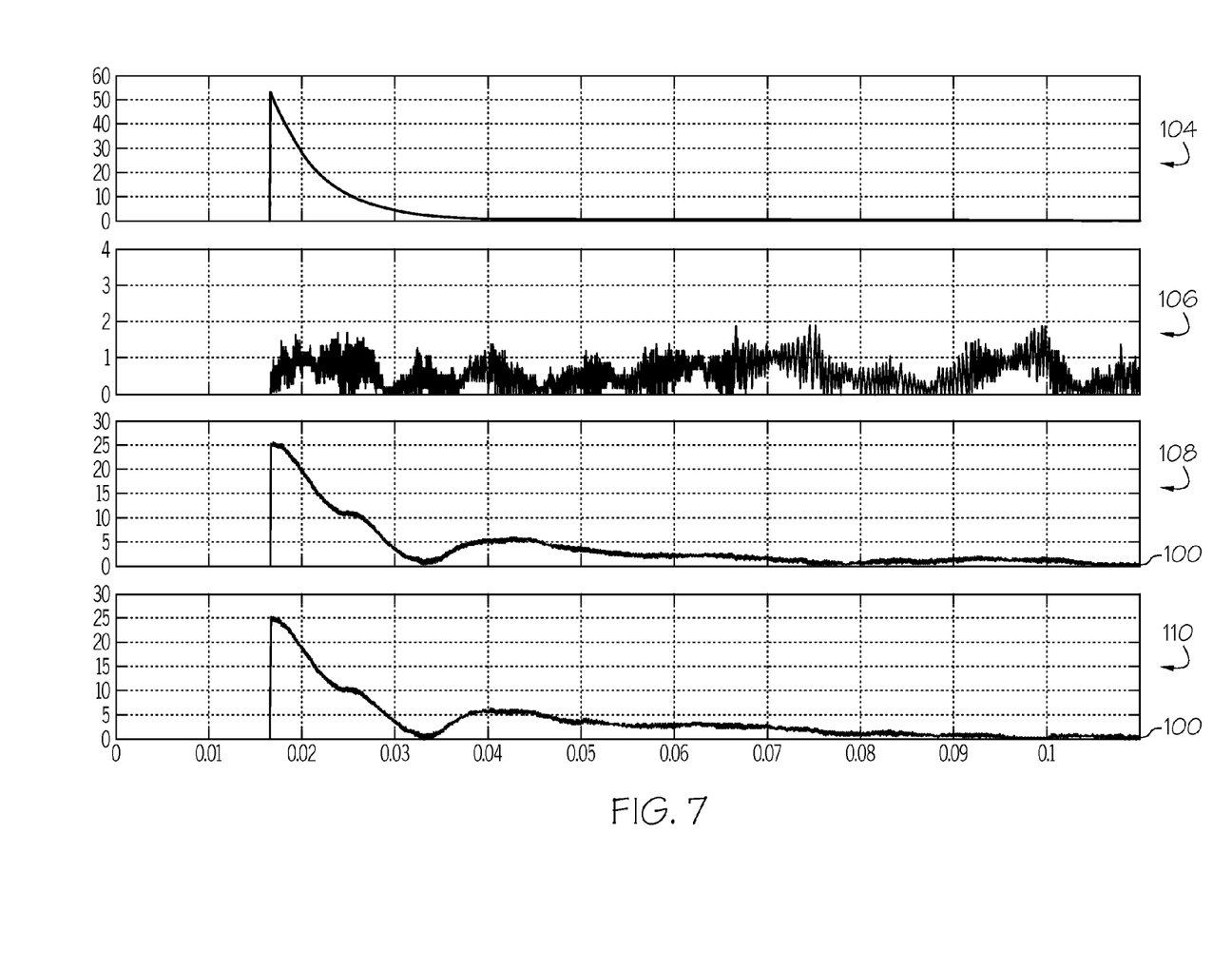
FIG. 7 is a view showing multiple graphs of the DC content in the AC side of the inverter of FIG. 1 when the output is obtained through methods of the present invention.
Figure 8:
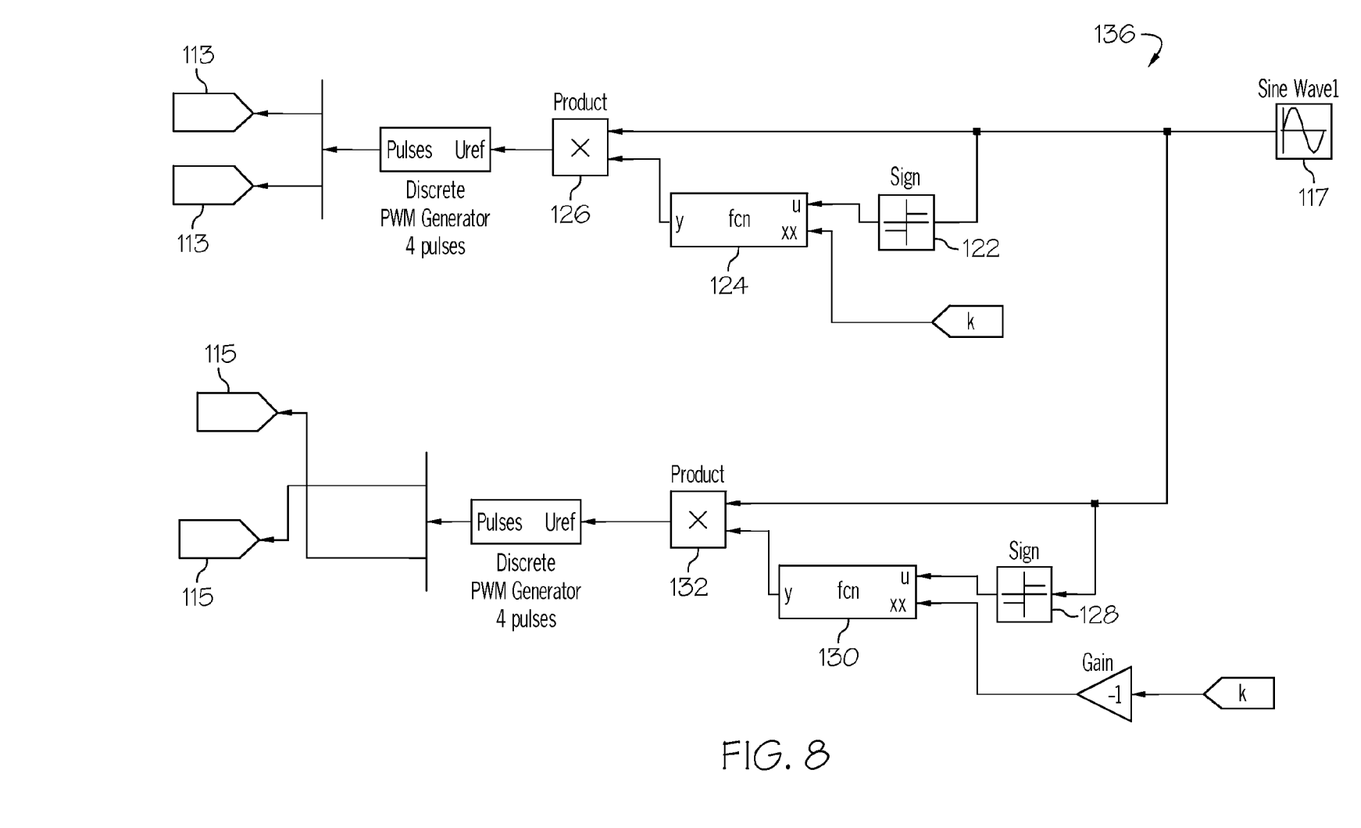
FIG. 8 is a block diagram showing a system usable to generate carrier signals usable in the methods of the present invention.

Referring to FIG. 7, there are shown traces 104, 106, 108, 110 showing the DC content of the AC output obtained by applying the methods of the present invention. More specifically, the bottom two traces, 108, 110 show the DC content on each AC leg (e.g., Va, Vb (see FIG. 1)) of a typical inverter (e.g., inverter 10) when the carrier signal 102 (see FIG. 4) of the present invention is used to provide gating signal (e.g., gating signal 14) to the power devices (e.g., IGBTs 12) of the inverter. The second trace 106 shows the DC component of the line-to-line voltage Vab. The top trace 104 shows the DC content in the load current. As can be see from FIG. 6, the DC component of each AC leg (e.g., Va, Vb (see FIG. 1)) is substantially reduced from that of the prior art (see FIG. 3).

Referring now to FIG. 7, there is shown a block diagram of a system 136 usable to generate carrier signals 113, 115 usable in the methods of the present invention. A sine wave generator signal 117 may be split into a first signal 118 and a second signal 120. The first signal 118 may be passed through a sign block 122 such that when u(t)<0, the signal is allowed to pass. The factor y may then be determined through the formula y=1+k, as described above, at block 124, using k as determined with reference to FIG. 6. The factor y may be multiplied at block 126 by the first signal 118 to give $u_n(t)$ which is used to generate two carrier signals 113 of the four carrier signals 11d, 115.

The second signal 120 may be passed through a sign block 128 such that when u(t)>0, the signal is allowed to pass. The factor y may then be determined through the formula y=1−k, as described above, at block 130, using k as determined with reference to FIG. 6. The factor y may be multiplied at block 132 by the second signal 120 to give $u_n(t)$ which is used to generate two carrier signals 115 of the four carrier signals 113, 115.

These four carrier signals 113, 115 are unsymmetrically determined to minimize the amount of DC content on the AC side of an inverter.

Figure 9:
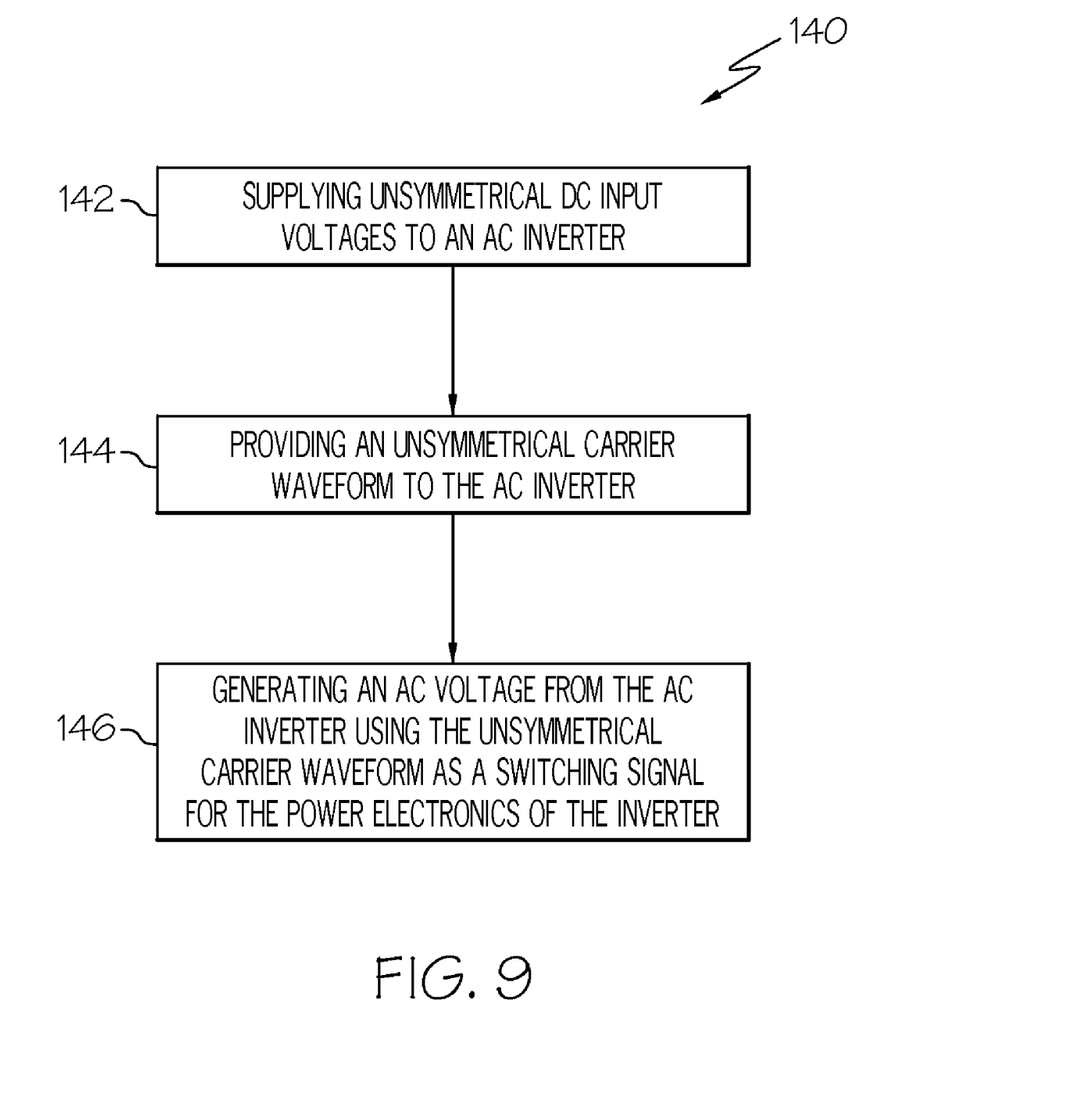
FIG. 9 is a flow chart describing a method for mitigating the DC content of an AC output according to the present invention.

Referring now to FIG. 9, there is shown a flow chart 140 describing a method for providing an AC voltage with reduced DC content according to the present invention. The method may include a first step 142 of supplying unsymmetrical DC input voltages (e.g., voltages 16, 18) to an AC inverter (e.g., inverter 10). The method may include a further step 144 of providing an unsymmetrical carrier waveform (e.g., waveform $u_n(t)$) to the AC inverter. This unsymmetrical carrier waveform may be offset from a symmetrical carrier waveform by a factor k. This factor k may be determined by, for example, the degree of unsymmetry between the DC input voltages. Finally, the method may include a step 146 of generating an AC voltage from the AC inverter using the unsymmetrical carrier waveform as a switching signal for the power electronics (e.g., IGBT 12) of the inverter.

It should be understood, of course, that the foregoing relates to exemplary embodiments of the invention and that modifications may be made without departing from the spirit and scope of the invention as set forth in the following claims.

We claim:

1. A method for providing an AC voltage with reduced DC content from an AC inverter, the method comprising:
   providing an unsymmetrical carrier waveform to the AC inverter;
   generating an AC voltage from the AC inverter using the unsymmetrical carrier waveform as a power electronics switching signal;
   measuring the AC voltage; and
   calculating an amount of the DC content in each phase of the AC voltage individually.

2. The method of claim 1, further comprising supplying unsymmetrical DC input voltages to the AC inverter.

3. The method of claim 1, wherein the unsymmetrical carrier waveform, $u_n(t)$ is defined by the following equations:

$u_n(t)=(1+k)*u(t)$ when $u(t)<0$ and $u_n(t)=(1-k)*u(t)$ when $u(t)>0$, wherein k is a factor representing the unsymmetrical nature of the carrier waveform and u(t) is a symmetrical waveform.

4. The method of claim 3, further comprising determining the value for k based on unsymmetrical DC input voltages.

5. The method of claim 3, further comprising determining the value for k based on the percentage of the DC content in the AC voltage.

6. The method of claim 1, further comprising comparing the DC content of each phase to a zero value.

7. The method of claim 2, wherein the unsymmetrical DC input voltages are from fuel cells, batteries or rectifiers.

8. The method of claim 1, wherein the AC voltage is used for at least one of motor drive, main engine start and auxiliary power unit start.

9. A method for providing an AC voltage with reduced DC content from an AC inverter, the method comprising:
   supplying unsymmetrical DC input voltages to the AC inverter;
   providing an unsymmetrical carrier waveform to the AC inverter; and
   generating an AC voltage from the AC inverter using the unsymmetrical carrier waveform as a power electronics switching signal,
   wherein the unsymmetrical carrier waveform is offset from a symmetrical carrier waveform by a factor k, wherein the factor k is determined by the percentage difference between the unsymmetrical DC input voltages.

10. The method of claim 9, wherein the unsymmetrical carrier waveform, $u_n(t)$ is defined by the following equations:

$u_n(t)=(1+k)*u(t)$ when $u(t)<0$ and $u_n(t)=(1-k)*u(t)$ when $u(t)>0$, wherein u(t) is the symmetrical waveform.

11. The method of claim 9, wherein the symmetrical waveform is a sine wave.

12. A DC-AC inverter for producing an AC voltage from an unsymmetrical DC voltage input, the inverter comprising:
   at least a first and a second power electronic device for each phase of the AC voltage; and
   a carrier waveform for switching the power electronics, wherein the carrier waveform is an unsymmetrical carrier waveform offset from a symmetrical carrier waveform by a factor k,
   wherein the unsymmetrical waveform provides the AC voltage with reduced DC content as would be produced in the AC voltage when a DC voltage input is a symmetrical DC voltage input.

13. The inverter of claim 12, wherein the power electronics are insolated gate bipolar transistors.

14. The inverter of claim 12, wherein the unsymmetrical carrier waveform, $u_n(t)$ is defined by the following equations:

$u_n(t)=(1+k)*u(t)$ when $u(t)<0$ and $u_n(t)=(1-k)*u(t)$ when $u(t)>0$, wherein u(t) is the symmetrical waveform.

* * * * *